Feb. 14, 1928.
W. L. DELKER
1,659,245
COASTER WAGON
Filed April 21, 1925      2 Sheets-Sheet 2
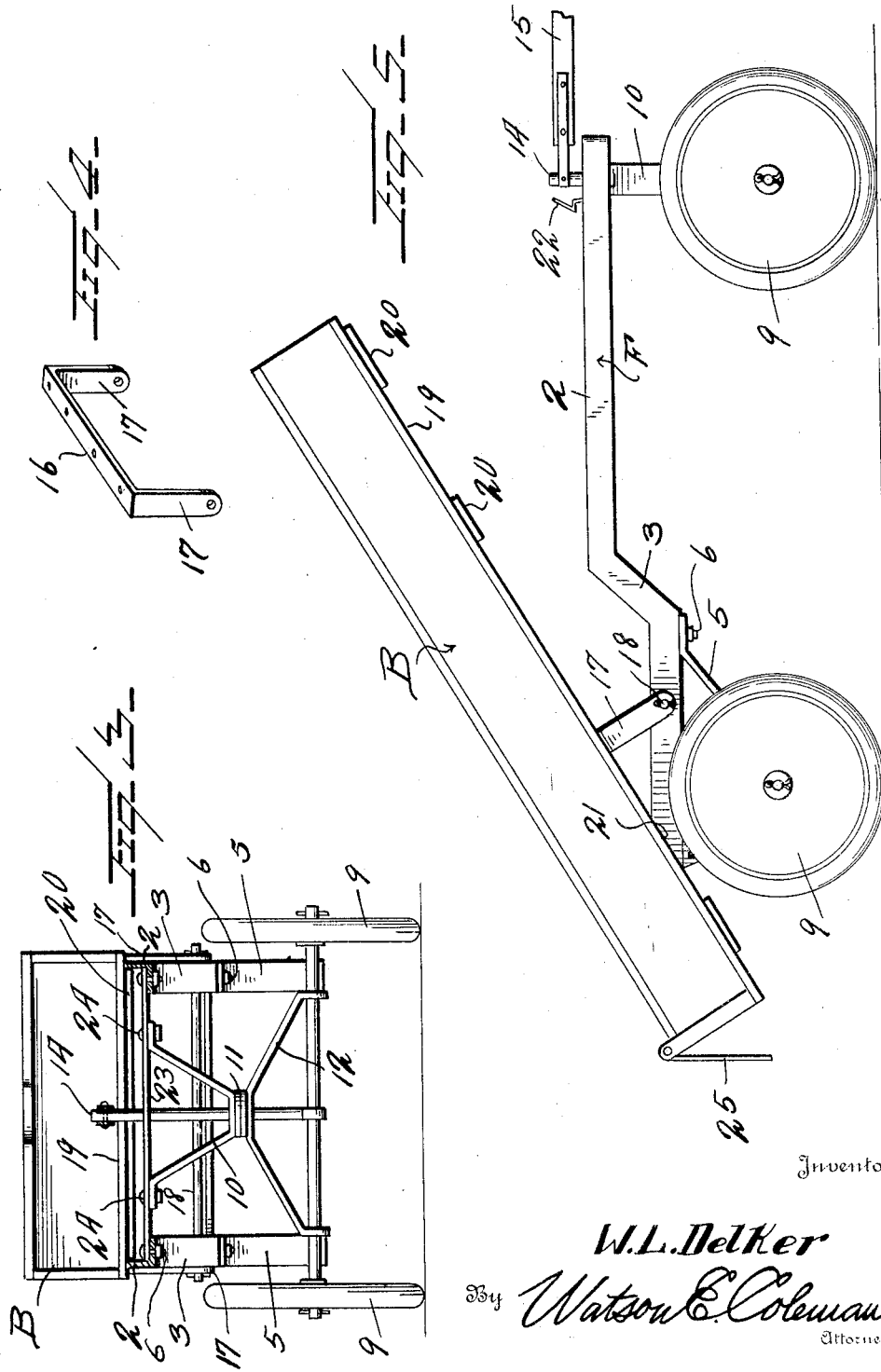
Inventor
W. L. Delker
By Watson E. Coleman
Attorney Patented Feb. 14, 1928.

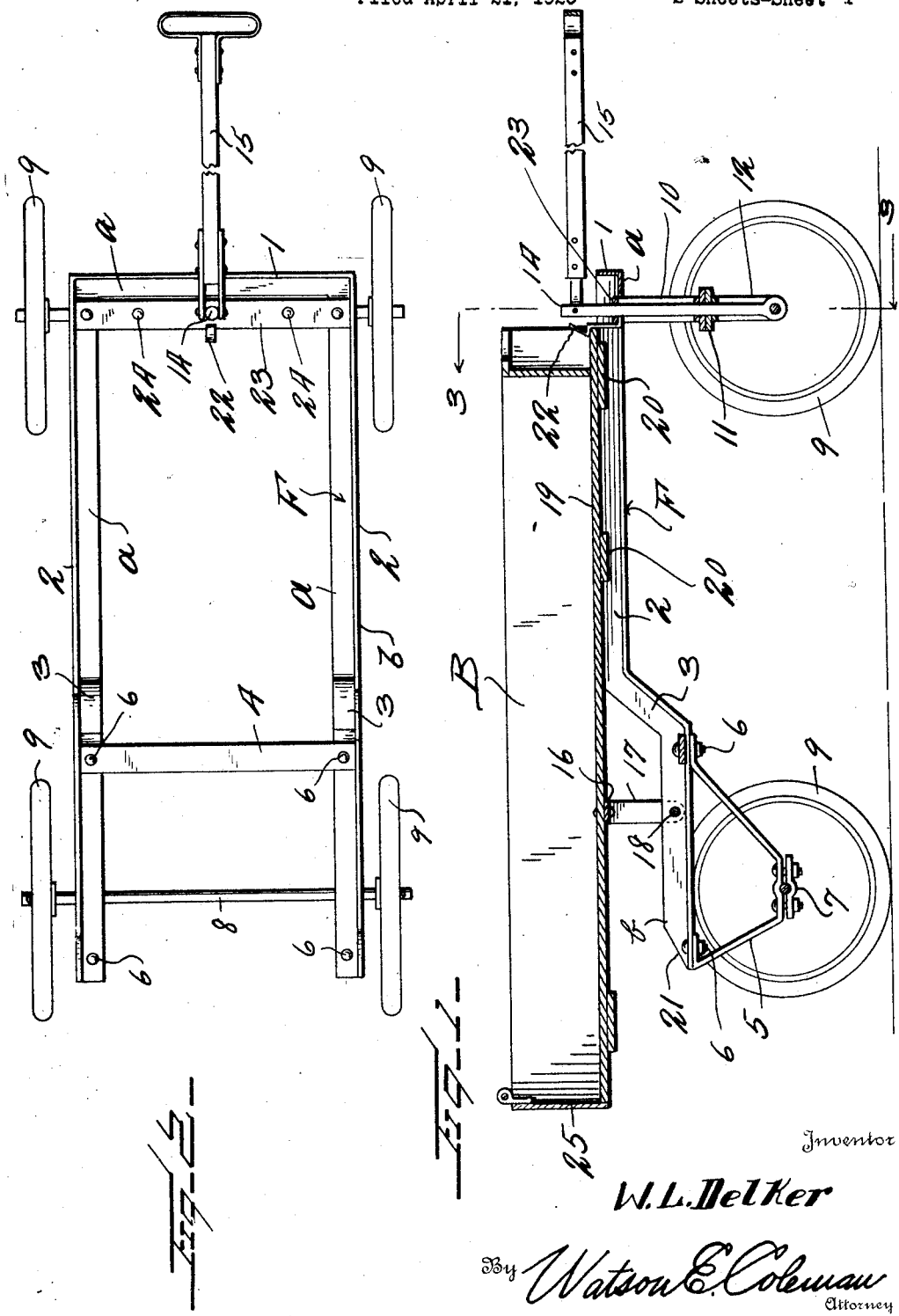

1,659,245

UNITED STATES PATENT OFFICE.

WILLIAM L. DELKER, OF HENDERSON, KENTUCKY, ASSIGNOR TO THE GEORGE DELKER COMPANY, OF HENDERSON, KENTUCKY, A CORPORATION OF DELAWARE.

COASTER WAGON.

Application filed April 21, 1925. Serial No. 24,822.

This invention relates to certain improvements in coaster wagons and it is an object of the invention to provide a vehicle of this kind provided with a body mounted thereon in a manner whereby the same may be readily moved or tilted into dumping position when desired.

It is also an object of the invention to provide a vehicle of this kind wherein is provided a wheel supported frame having a body mounted thereon for tilting movement together with means comprised in the structure of the frame to limit the tilting or dumping movement of the body.

The invention consists in the details of construction and in the combination and arrangement of the several parts of my improved coaster wagon whereby certain important advantages are attained and the device rendered simpler, less expensive and otherwise more convenient and advantageous for use, as will be herinafter more fully set forth.

The novel features of my invention will hereinafter be definitely claimed.

In order that my invention may be the better understood, I will now proceed to describe the same with reference to the accompanying drawings, wherein:—

Figure 1 is a longitudinal vertical sectional view taken through a wagon constructed in accordance with an embodiment of my invention;

Figure 2 is a view in top plan of the structure as illustrated in Figure 1 with the body removed;

Figure 3 is a sectional view taken substantially on the line 3—3 of Figure 1;

Figure 4 is a view in perspective of the strap and arms secured to the bottom of the wagon body;

Figure 5 is a view in side elevation of my wagon as herein disclosed with the body in its tilting or dumping position.

As disclosed in the accompanying drawings, the frame F of my improved body is substantially U-shaped in form and formed of angle iron, the intermediate portion 1 of the frame F being forwardly directed with the horizontal flanges $a$ of said intermediate portion 1 and the side members 2 being inwardly disposed and defining the lower marginal portions thereof. The rear portions of the side members 2 of the frame F are downwardly offset, as at 3, so that said rear or free end portions of the side members 2 are positioned a desired distance below the forward portions of said side members. The flanges $a$ of said rear or free end extremities of said side members 2 immediately adjacent to the offsets 3 are connected by the cross member 4, said connections preferably constituting bolts which also provide attaching means for the inner legs of the bolsters 5 depending from the free or rear end portions of the side members 2. The outer legs of the bolsters 5 are also secured to said flanges $a$ by bolts 6 or the like.

Clamped, as at 7, or otherwise attached to the lower portions of the bolsters 5 is the transversely disposed rear axle 8 on the extremities of which are suitably mounted the supporting wheels 9.

Depending from the forward end portion of the frame F is a bolster 10 substantially in the form of a V. This bolster 10 is positioned at the transverse center of the intermediate portion 1 and has its lower portion coacting with the fifth wheel structure 11 carried by the front steering truck 12, said truck having an upstanding steering rod 14 extending above the frame F. As is particularly illustrated in Figures 1 and 3, it is to be noted that the rod 14 also serves as a king pin to provide the requisite pivotal connection between the fifth wheel structure 11 and the bolster 10. To the upper extremity of the steering rod 14 is a handle 15 of a conventional type.

The body B of the vehicle is of requisite dimensions and configuration and has disposed thereacross at a point rearwardly of but closely adjacent to its longitudinal center a strap 16 the extremities of which being provided with the substantially perpendicularly related arms 17 disposed in a direction away from the body B. The free extremities of the arms 17 are pivotally engaged with the extended end portions of a rod 18 disposed across the frame F and through the flanges $b$ of the side members 2 at a point rearwardly of but relatively close to the offsets 3. By this means, the body B is supported for convenient tilting or dumping movement but when in its normal or horizontal position the forward portion of the body B is supported by the forward portions of the side members 2 of the frame F, the arms 17 being of a length to compensate for the extent of the offsets 3.

The body B preferably rests upon the upper edges of the forward portions of the side members 2 and secured to the bottom 19 of the body B are the cross members 20 which snugly fit between the flanges *b* of the side members 2 so that when the body B is in its normal or horizontal position, said body is effectively held against undue lateral movement which would otherwise have a tendency to hinder the efficiency of the arms 17. The cross members 20 are herein disclosed as two in number and spaced lengthwise of the bottom 19 but closely adjacent to each other.

The rear or free ends of the side members 2 are disposed on a predetermined upward and inward bevel, as at 21, with which the bottom 19 of the body B flatly contacts when said body is in its full tilting or dumping position whereby the body B when in such position is prevented from coming into contact with the ground or other surface upon which the vehicle is positioned.

When the body B is in its normal or horizontal position the forward end portion of the bottom 19 is engaged by the upstanding spring catch 22 suitably secured to the cross member 23 interposed between the side members 2 of the frame F immediately adjacent to the intermediate portion 1. The bolster 10 hereinbefore referred to is secured directly to this member 23 by the bolts 24 or the like and the steering rod 14 is disposed therethrough.

The rear end of the body B is provided with a swinging end gate 25 of any preferred type or construction.

While I have hereinbefore referred to the frame F as being formed of angle iron it is to be understood that this frame can also be made of wood or otherwise as may be preferred.

From the foregoing description it is thought to be obvious that a coaster wagon constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

A coaster wagon comprising a frame having forward and rear offset portions lying in parallel horizontal planes, front and rear wheel trucks supporting the forward and rear portions of the frame respectively, the peripheries of the wheels lying below the horizontal plane of the upper edge of the lower portion of the frame, the rear end of the frame lying rearwardly of the vertical centers of the rear wheels, a U-shaped arm pivotally connected at its ends with the rear portion of the frame at points in advance of the centers of the rear wheels, the intermediate portion of said arm adapted to lie in the same plane as that occupied by the upper edges of the forward portion of the frame when the said arm is in a vertical position, and a body mounted at a line between its ends upon said arm and adapted to rest upon the upper edges of the forward portion of the frame when the arm is in a vertical position and engage the rear end of the frame when the arm is tilted rearwardly.

In testimony whereof I hereunto affix my signature.

WILLIAM L. DELKER.